United States Patent
Väth et al.

(10) Patent No.: US 10,632,813 B2
(45) Date of Patent: Apr. 28, 2020

(54) ADJUSTABLE SPRING SUPPORT

(71) Applicant: ZF Friedrichshafen AG

(72) Inventors: Andreas Väth, Schweinfurt (DE); Josef Renn, Dettelbach (DE); Tom Schneider, Burkardroth (DE); Jan Rossberg, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 220 days.

(21) Appl. No.: 15/573,525

(22) PCT Filed: Apr. 12, 2016

(86) PCT No.: PCT/EP2016/057999
§ 371 (c)(1),
(2) Date: Jan. 25, 2018

(87) PCT Pub. No.: WO2016/180591
PCT Pub. Date: Nov. 17, 2016

(65) Prior Publication Data
US 2018/0201084 A1    Jul. 19, 2018

(30) Foreign Application Priority Data
May 12, 2015   (DE) .................. 10 2015 208 787

(51) Int. Cl.
*B60G 17/04*   (2006.01)
*B60G 11/16*   (2006.01)
(Continued)

(52) U.S. Cl.
CPC .......... *B60G 17/0408* (2013.01); *B60G 11/16* (2013.01); *B60G 15/12* (2013.01); *B60G 17/021* (2013.01); *B60G 17/0272* (2013.01); *B60G 17/08* (2013.01); *B60G 2202/413* (2013.01); *B60G 2202/42* (2013.01); *B60G 2204/1242* (2013.01); *B60G 2500/30* (2013.01)

(58) Field of Classification Search
CPC .............. B60G 17/027; B60G 17/0272; B60G 17/0408; B60G 17/08
See application file for complete search history.

(56) References Cited

U.S. PATENT DOCUMENTS 6,318,525 B1 * 11/2001 Vignocchi ............ B60G 15/063
188/266.6
7,306,079 B2 * 12/2007 Beck .................. B60G 17/0408
188/322.19
(Continued)

FOREIGN PATENT DOCUMENTS

DE         19849222      5/2000
DE         10019532      10/2001
(Continued)

*Primary Examiner* — Nicole T Verley
(74) *Attorney, Agent, or Firm* — Cozen O'Connor

(57) ABSTRACT

Adjustable spring support comprising a spring plate which is axially adjustable by an annular actuator, wherein the actuator is supplied with pressure medium via a pressure medium supply system, wherein the annular actuator has a pressure medium connection to the pressure medium supply system, and the housing of the actuator is connected directly to a housing of the pressure medium supply system.

11 Claims, 9 Drawing Sheets

(51) Int. Cl.
  *B60G 17/02* (2006.01)
  *B60G 17/027* (2006.01)
  *B60G 15/12* (2006.01)
  *B60G 17/08* (2006.01)

(56) References Cited

U.S. PATENT DOCUMENTS

| | | | | |
|---|---|---|---|---|
| 7,513,490 B2* | 4/2009 | Robertson | ............ | F16F 9/063 |
| | | | | 188/315 |
| 7,963,529 B2* | 6/2011 | Oteman | ............ | B60G 13/001 |
| | | | | 188/266 |
| 8,840,118 B1* | 9/2014 | Giovanardi | ......... | F15B 13/0444 |
| | | | | 280/5.5 |
| 9,090,141 B2* | 7/2015 | Schmidt | ............ | B60G 17/0272 |
| 9,180,746 B2* | 11/2015 | Kasuga | ............ | B60G 17/0272 |
| 9,303,715 B2* | 4/2016 | Dillman | ............ | F16F 9/49 |
| 9,358,853 B2* | 6/2016 | Ishikawa | ............ | B60G 17/0152 |
| 9,707,814 B2* | 7/2017 | Zuckerman | ............ | H02K 5/12 |
| 9,855,814 B2* | 1/2018 | Tucker | ............ | B60G 17/04 |
| 10,160,279 B2* | 12/2018 | Khaja | ............ | B60G 11/14 |
| 10,308,090 B2* | 6/2019 | Stolle | ............ | B60G 15/06 |
| 2001/0033047 A1 | 10/2001 | Beck | | |
| 2002/0030311 A1 | 3/2002 | Beck | | |
| 2004/0051270 A1 | 3/2004 | Causemann | | |
| 2013/0249183 A1* | 9/2013 | Ellifson | ............ | B60G 13/08 |
| | | | | 280/124.157 |
| 2014/0312580 A1* | 10/2014 | Gale | ............ | B60G 21/073 |
| | | | | 280/5.509 |

FOREIGN PATENT DOCUMENTS

| | | |
|---|---|---|
| DE | 10109555 | 5/2002 |
| DE | 10227713 | 2/2004 |
| EP | 2301773 | 3/2011 |
| WO | WO2011124513 | 10/2011 |

\* cited by examiner

ADJUSTABLE SPRING SUPPORT

PRIORITY CLAIM

This is a U.S. national stage of application No. PCT/EP2016/057999, filed on Apr. 12, 2016. Priority is claimed on the following application: Country: Germany, Application No.: 10 2015 208 787.5, filed: May 12, 2015; the content of which is incorporated in its entirety herein by reference.

FIELD OF THE INVENTION

The invention is directed to an adjustable spring support with an actuator and a pressure medium supply system.

BACKGROUND OF THE INVENTION

Known from DE 32 23 195 A1 is an adjustable spring support which has a first spring plate and a second spring plate, wherein the distance between the two spring plates can be varied by an actuator which can be actuated by pressure medium for specific preloading of a supporting spring arranged between the two spring plates in order to achieve a required carrying capacity.

A hydraulic medium is used as pressure medium. A pump conveys pressure medium from a supply receptacle to a cylinder of the actuator. A piston which is connected to one of the two spring plates is slidingly mounted in the cylinder.

As can be seen from the drawing, there is a conduit system between the pump, a storage and the actuator. This division of components has the advantage that the total system can be distributed in a vehicle and, in so doing, individual components such as the pump or the storage can also be positioned farther apart from one another in a vehicle. This increases the expenditure on conduits and assembly as well as the risk of leaks.

Further, at least one flow valve is required for each vehicle wheel to enable adjustment of the required vehicle body level or preloading of the supporting spring via the spring support.

It is an object of the present invention to realize an adjustable spring support with a pressure medium system which can be assembled in a simple manner.

SUMMARY OF THE INVENTION

This object is met in that the annular actuator has a pressure medium connection to the pressure medium supply system, and the housing of the actuator is connected directly to a housing of the pressure medium supply system.

Hoses and exposed couplings can be dispensed with as a result of arranging the entire pressure medium system as a constructional unit. Further, the overall assembly is simplified. For example, if a plurality of spring supports are used in a chassis, then one flow supply connection and one CAN-bus connection are sufficient to achieve the required function.

The housing of the pressure medium supply system carries at least one pump, a pump drive and a supply receptacle. Accordingly, hose connections which are prone to leakage can be dispensed with.

In a further advantageous embodiment, the housing of the actuator is fastened to an outer cylinder of a vibration damper. The housing of the pressure medium supply system is also fastened to the outer cylinder via the housing of the actuator.

According to an advantageous embodiment, the housing of the pressure medium supply system is arranged so as to be radially offset with respect to the longitudinal axis of the outer cylinder. "Radially offset" can mean that the main axes of the vibration damper and of the pressure medium supply system extend paraxially but also so as to be skew with respect to one another.

The supply receptacle is preferably arranged above the pump so as not to additionally increase the required pumping outputs.

Further, it can be provided that an annular actuator housing and the housing of the pressure medium supply system are formed integrally. The two housings can be combined in a forged, cast or even extruded component part.

A particularly slender actuator is achieved when the outer cylinder of the vibration damper forms an inner wall of a pressure medium chamber of the actuator.

The actuator is supported on a radial step of the outer cylinder of the vibration damper so that a supporting spring which is as short and, therefore, as light as possible can be used. The step can be formed by at least one separate component part such as, e.g., a retaining ring, but also by a shoulder of the outer cylinder.

Optionally, it can be provided that an actuator piston which is connected to the adjustable spring plate is guided so as to be fixed with respect to relative rotation. This option is particularly useful when the adjustable spring plate has a supporting surface for the supporting spring which is inclined or radially offset with respect to a second spring plate.

It is possible for the maximum displacement path of the spring plate to be limited by a mechanical stop. This configuration facilitates control of the adjustable spring plate because a maximum displacement path is very easy to sense.

Various constructions are possible for implementation of the mechanical stop, e.g., a retaining ring fixed to the outer receptacle. An especially simple solution consists in that the outer cylinder of the vibration damper carries a cap which forms the mechanical stop. A cap of this kind can support, e.g., a pressure stop buffer of the vibration damper.

BRIEF DESCRIPTION OF THE DRAWINGS

The invention will be described more fully referring to the following description of the figures in which.

DETAILED DESCRIPTION OF THE PRESENTLY PREFERRED EMBODIMENTS

Figure 1:
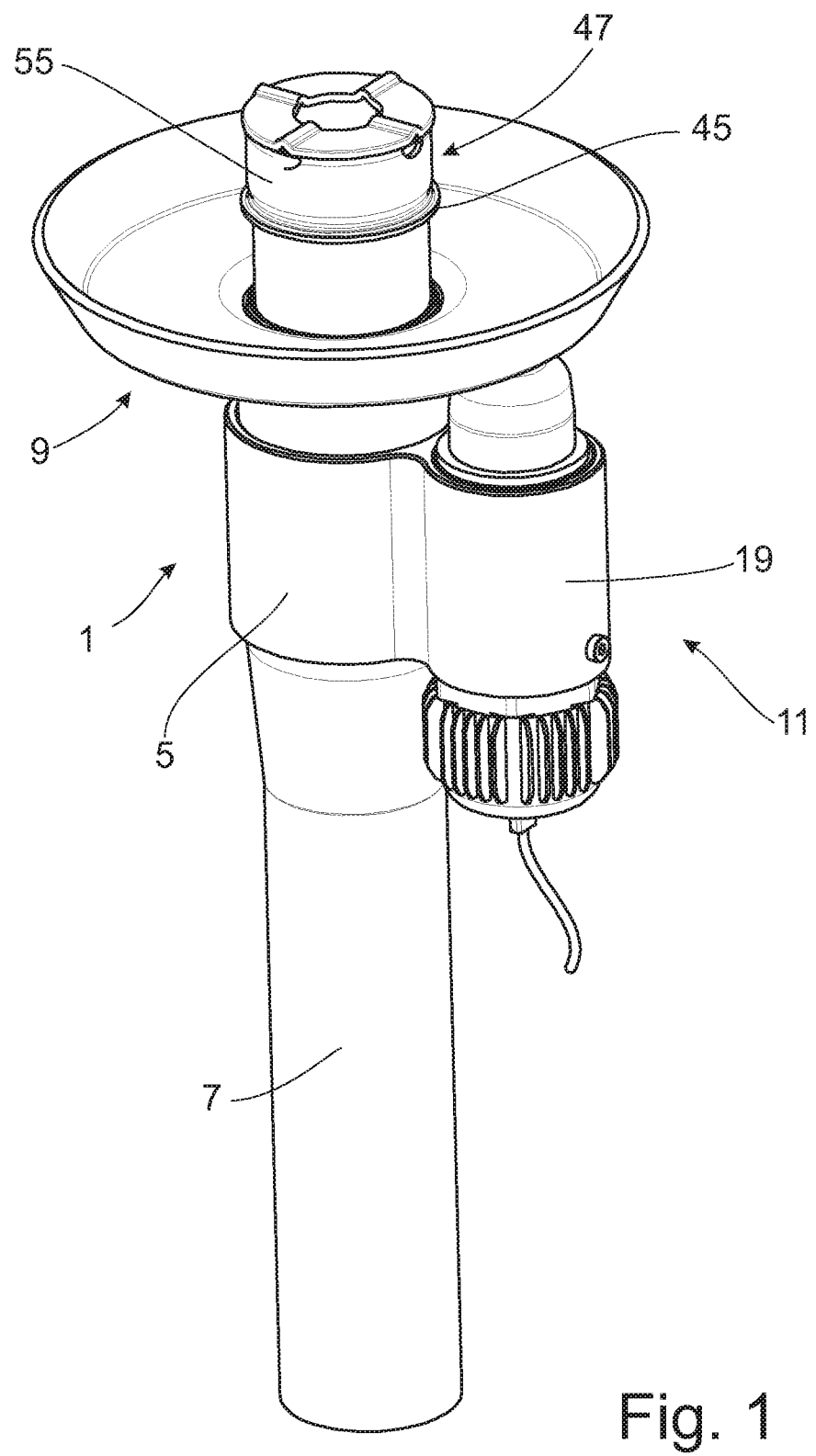
FIGS. 1 and 2 is an elevation and sectional view of a spring support at a vibration damper.
Figure 2:
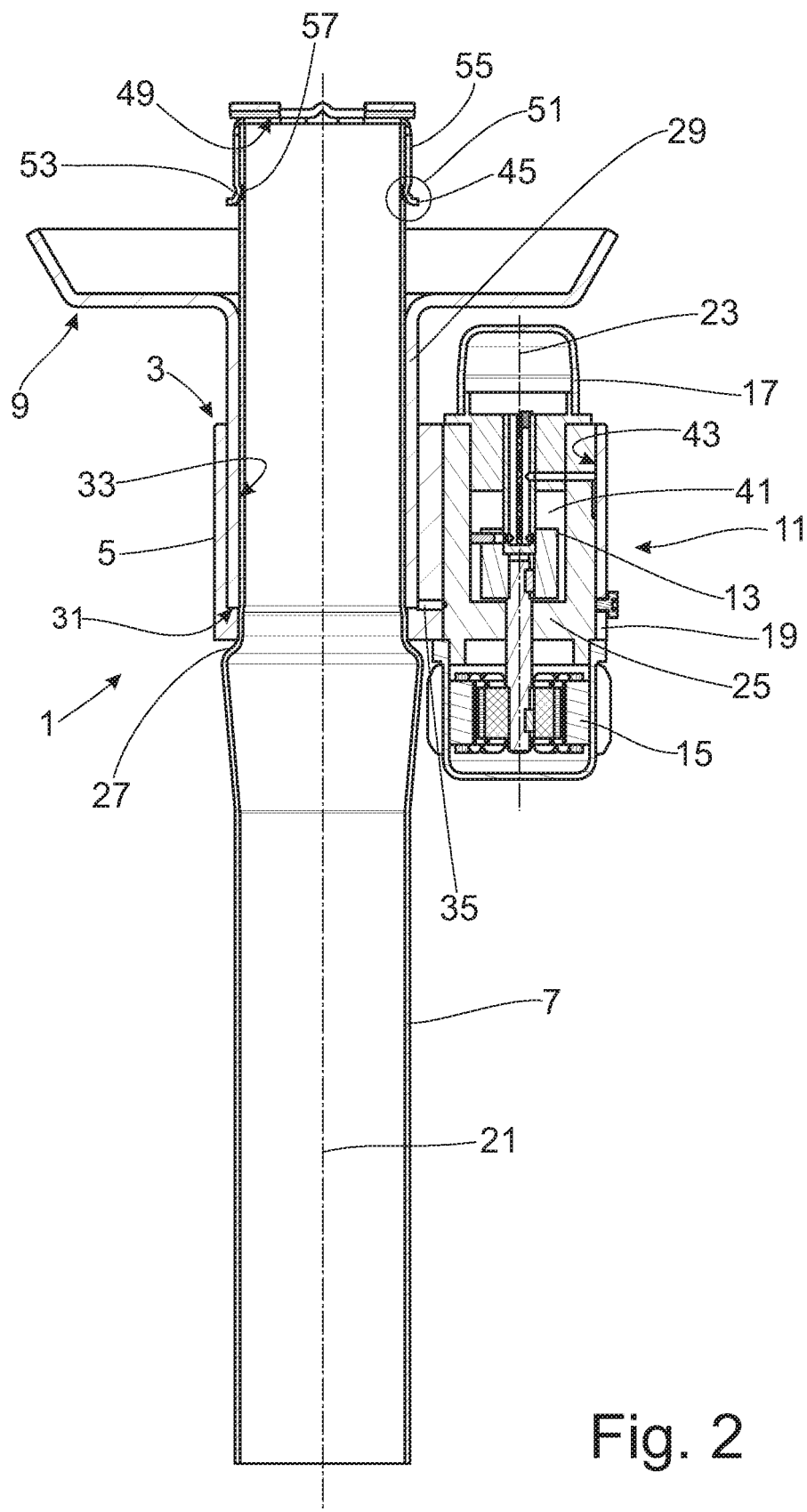

FIGS. 1 and 2 viewed together show a spring support 1 with an annular actuator 3, the housing 5 of which is fastened to an outer cylinder 7 of a vibration damper constructed in any manner. The actuator 3 serves to axially adjust a spring plate 9. The actuator 3 is supplied with pressure medium via a pressure medium supply system. 11.

The pressure medium supply system 11 comprises at least one pump 13, a pump drive 15 and a supply receptacle 17. The housing 5 of the actuator 3 is directly connected to a housing 19 for the pressure medium supply system 11. By direct connection between the two housings 5; 19 is meant that there is a mechanically rigid connection. Sealing means or adapter components can be provided if necessary, but no gap-bridging hose connections.

The housing 19 of the pressure medium supply system 11 carries at least the pump 13, the pump drive 15 and the supply receptacle 17. The housing 19 need not completely enclose components 13; 15; 17, but must provide at least connection surfaces to fulfill the supporting function.

As is further shown by FIGS. 1 and 2, the housing 19 of the pressure medium supply system 11 is arranged so as to be radially offset relative to the longitudinal axis 21 of the vibration damper. In this variant, a main axis 23 of the pressure medium supply system 11 extends in all planes parallel to the longitudinal axis of the outer cylinder 7.

In addition, it can be seen from the sectional view in FIG. 2 that the supply receptacle 17 is arranged above the pump 13. Directly below the supply receptacle 17, the pump 13 is located in a pump housing 25 which is in turn at least partially enclosed by housing 19. The pump drive 15 adjoins below the pump 13.

In this constructional variant, the annular housing 5 of the actuator and the housing 19 of the pressure medium supply system 11, hereinafter referred to as total housing, are formed integrally. "Integrally" means that the two housings 5; 19 in the end manufacturing state can no longer be separated without being destroyed.

The total housing 5; 19 is supported on a radial step 27 of the outer cylinder 7. In this case, the radial step 27 is formed by a widened diameter of the outer cylinder 7.

The adjustable spring plate 9 is connected to a piston 29 which is supported in a pressure medium chamber 31 of the actuator 3 so as to be axially slidingly displaceable and so as to be sealed. In this regard, the outer cylinder 7 of the vibration damper forms an inner wall 33 of the pressure medium chamber 31.

Figure 5:
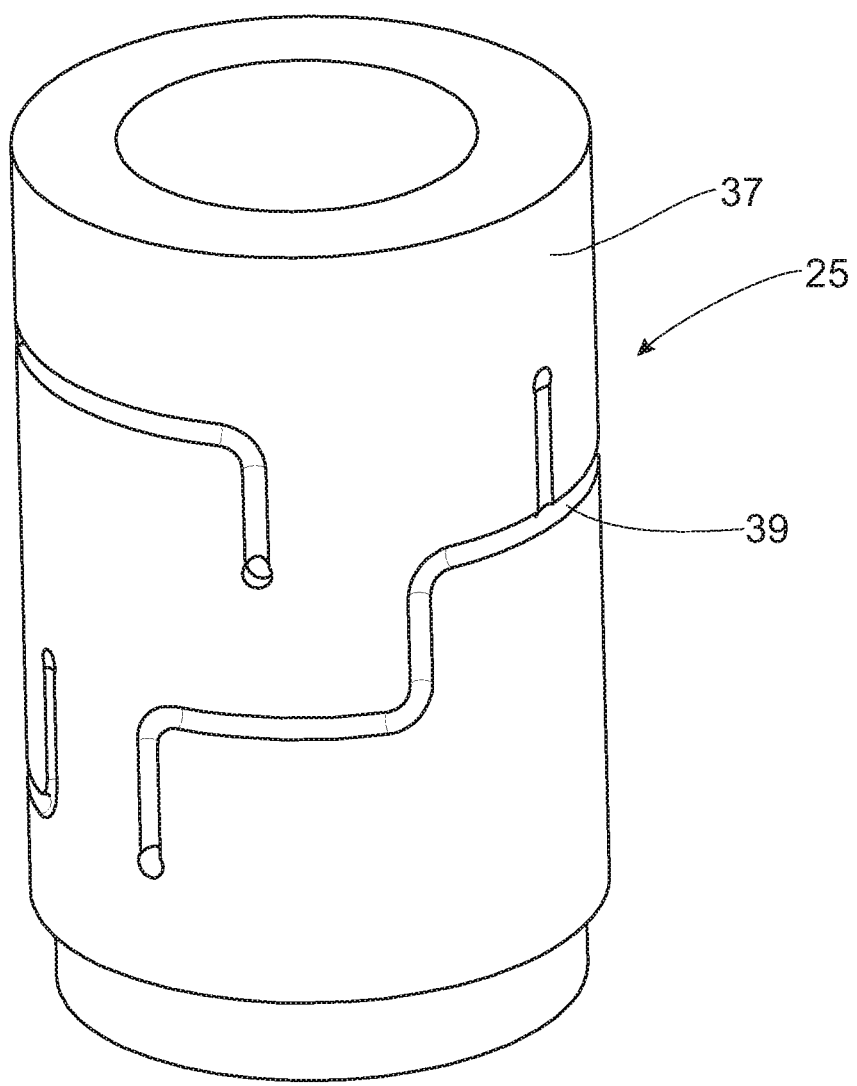
FIG. 5 is a perspective view of the pump housing as individual part.

The pressure medium chamber 31 has a pressure medium connection 35 in the total housing 5; 19 for the pump 13. A pressure medium channel 39 between a pump chamber 41 and the connection channel 35 is formed on an outer lateral surface 37 of the pump housing 25, see FIG. 5. The pump housing 25 is fashioned in the region of the outer lateral surface with a dimensional accuracy such that it seals the pressure medium channel 39 from the environment jointly with an inner wall 43 of the housing 19.

For axial displacement of the spring plate, pressure medium is conveyed from the supply receptacle 17 through the pressure medium channel 39 and the pressure medium connection 35 against the force of a spring, not shown, into the pressure medium chamber 31 via the pump drive 15 and the pump 13. The displacement path of the spring plate 9 is limited by a mechanical stop 45. To this end, this variant has a cap 47 which is pressed onto an end face 49 of the outer cylinder 7 or, alternatively, secured via a positive-engagement connection 51. In this case, the positive-engagement connection 51 is held via a bead 53 between a sleeve portion 55 of the cap and at least one groove 57 which can also be formed circumferentially at the cylinder 7.

In the construction according to FIGS. 1 and 2, the spring plate 9 is arranged at right angles to and concentric to the longitudinal axis 21 of the vibration damper or outer cylinder 7. In contrast, the spring support 1 according to FIG. 3 has an adjustable spring plate which is inclined relative to the longitudinal axis 21. In case of an inclined spring plate 9, it is necessary to ensure the defined inclination in circumferential direction through suitable measures.

Figure 6:
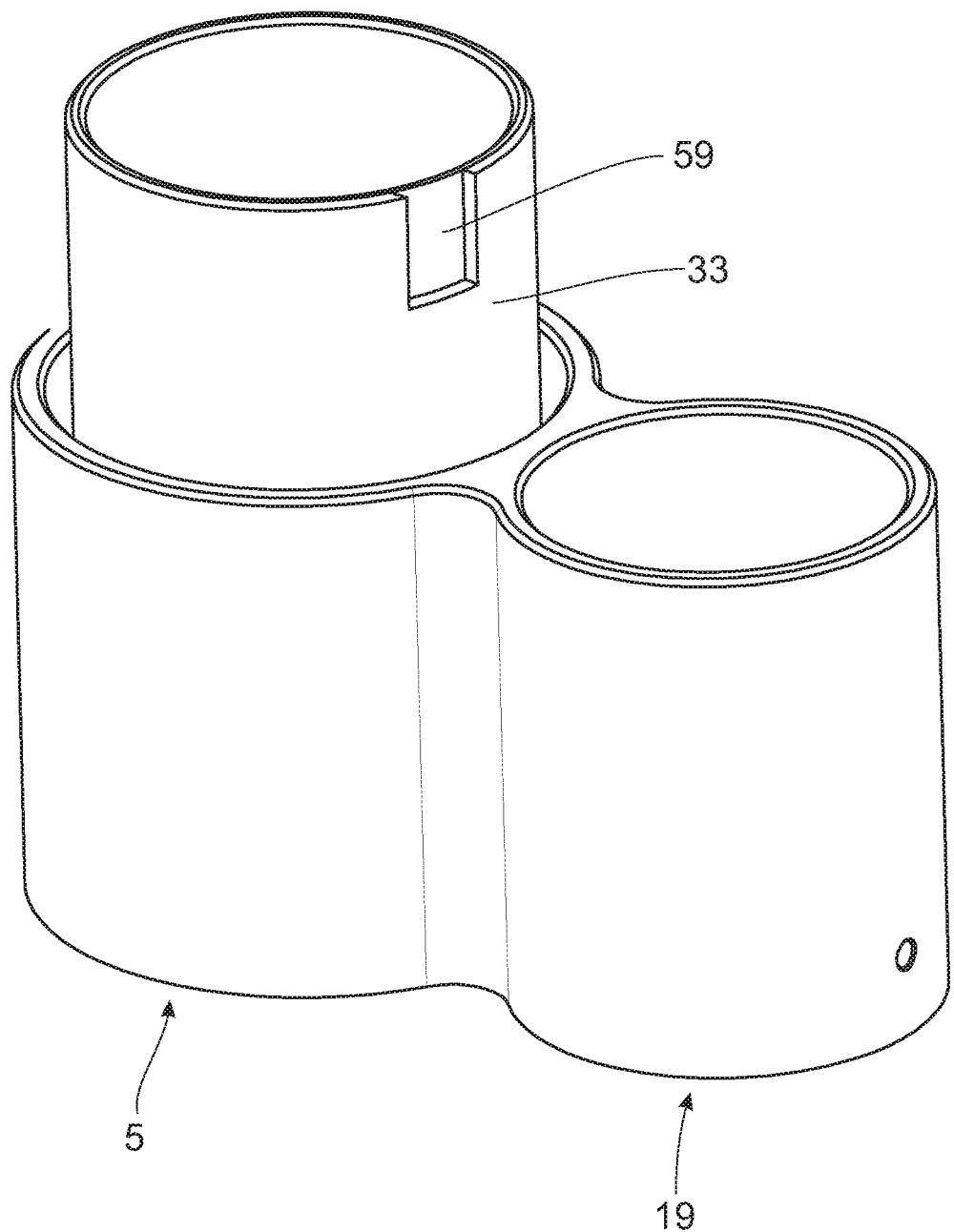
FIG. 6 is a perspective view of the total housing as individual part.

To this end, the housing 5 of the actuator, which also forms the inner wall 33 of the pressure medium chamber 31 in this variant as is shown in FIG. 6, has a positive-engagement segment 59 which, along with a complementary positive-engagement segment 61 of the piston 29 at the spring plate 9, ensures that the piston 29 and, therefore, the spring plate 9 is guided so as to be fixed with respect to relative rotation.

Another difference compared to the variant according to FIGS. 1 and 2 consists in that the mechanical stop 45 for limiting the displacement path of the spring plate 9 is formed by a retaining ring which engages in a circumferential groove 63. This variant is suitable particularly when the maximum displacement position of the spring plate 9 is at a large distance from the end face 49 of the outer cylinder 7.

Figure 3:
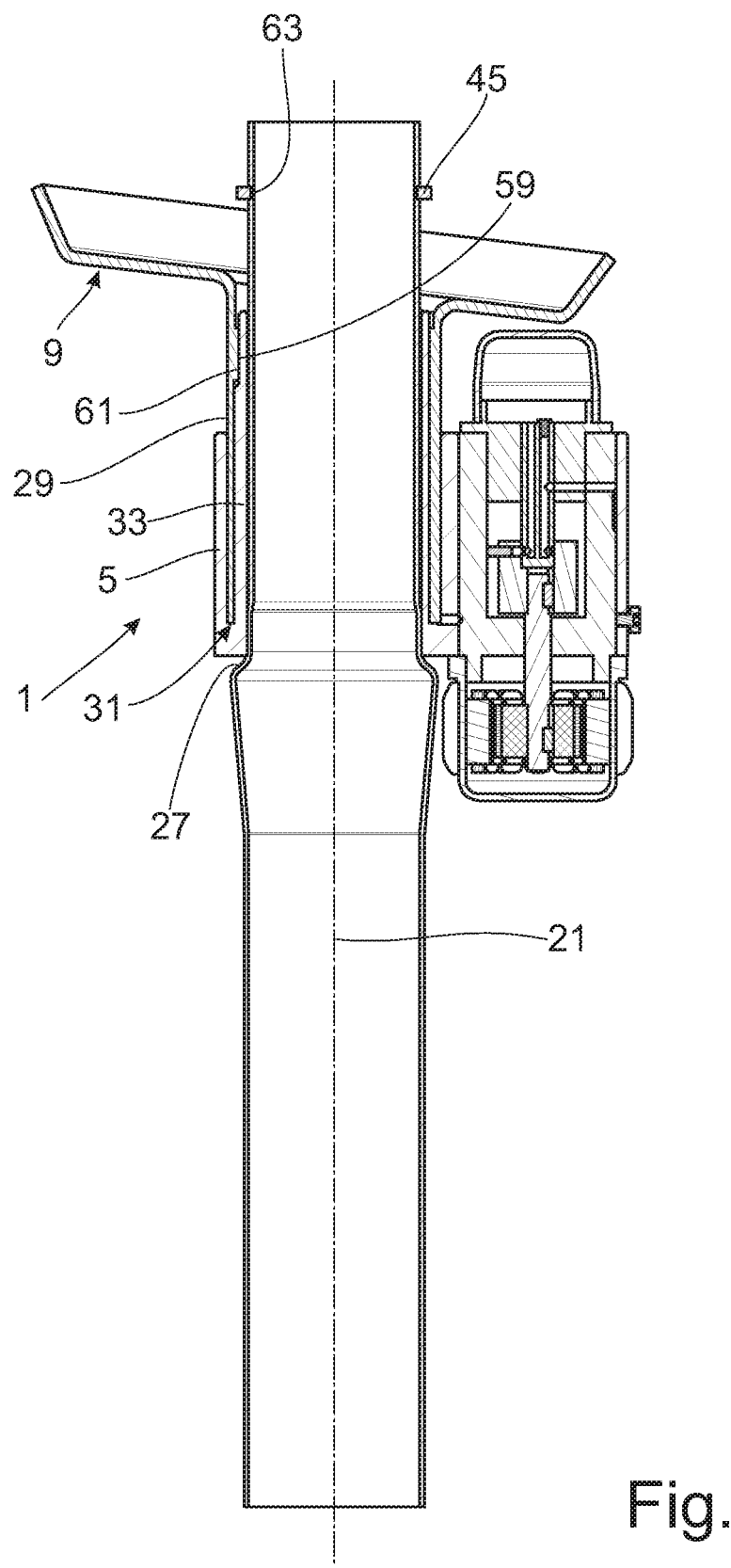
FIGS. 3 and 4 is a cross-sectional view of a spring support with spring plate which is fixed with respect to relative rotation.
Figure 4:
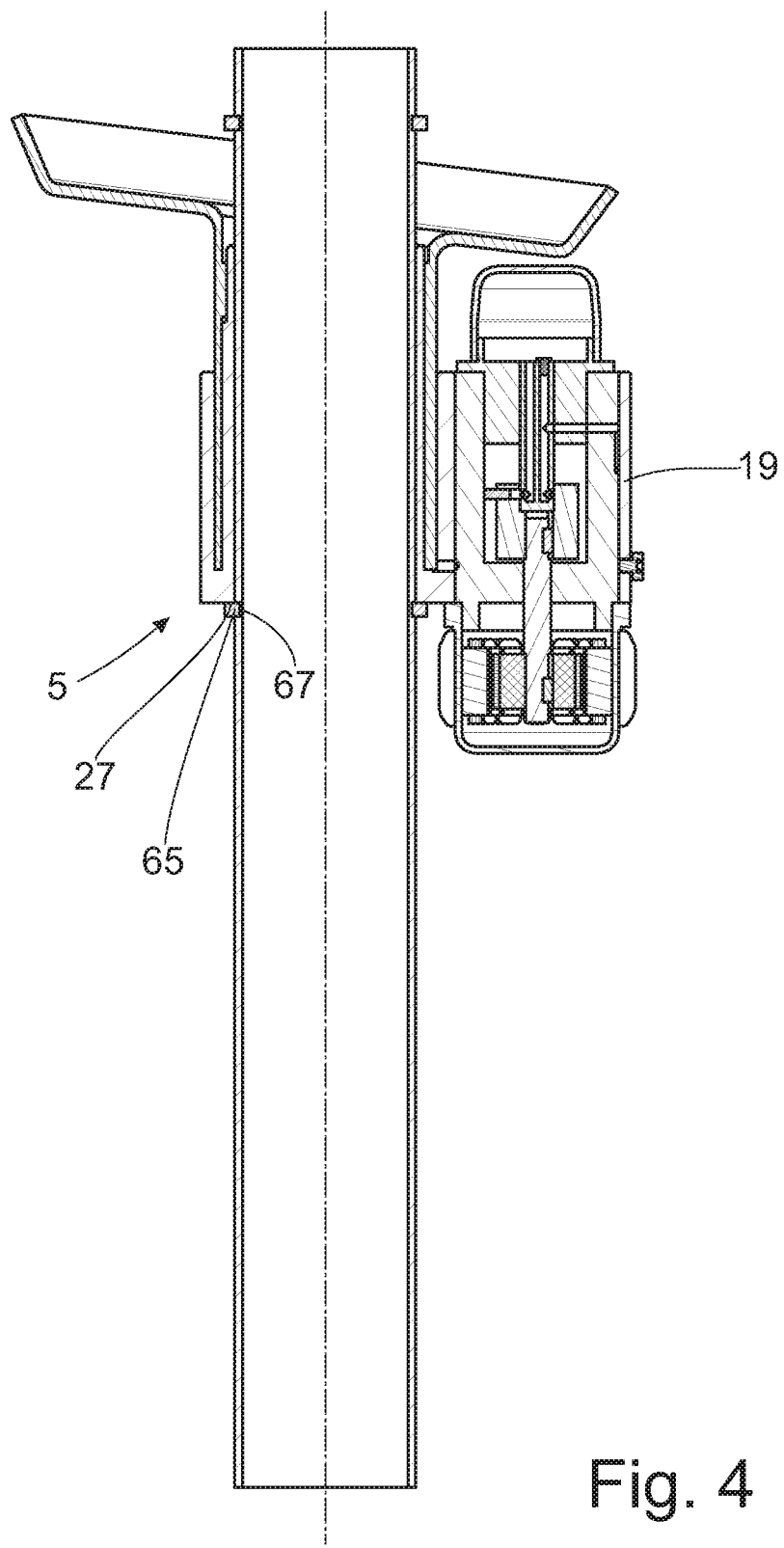

FIG. 4 is distinguished from FIG. 3 in that the radial step 27 for supporting the total housing 5; 19 is likewise formed by a retaining ring 65 in a groove 67.

Figure 7:
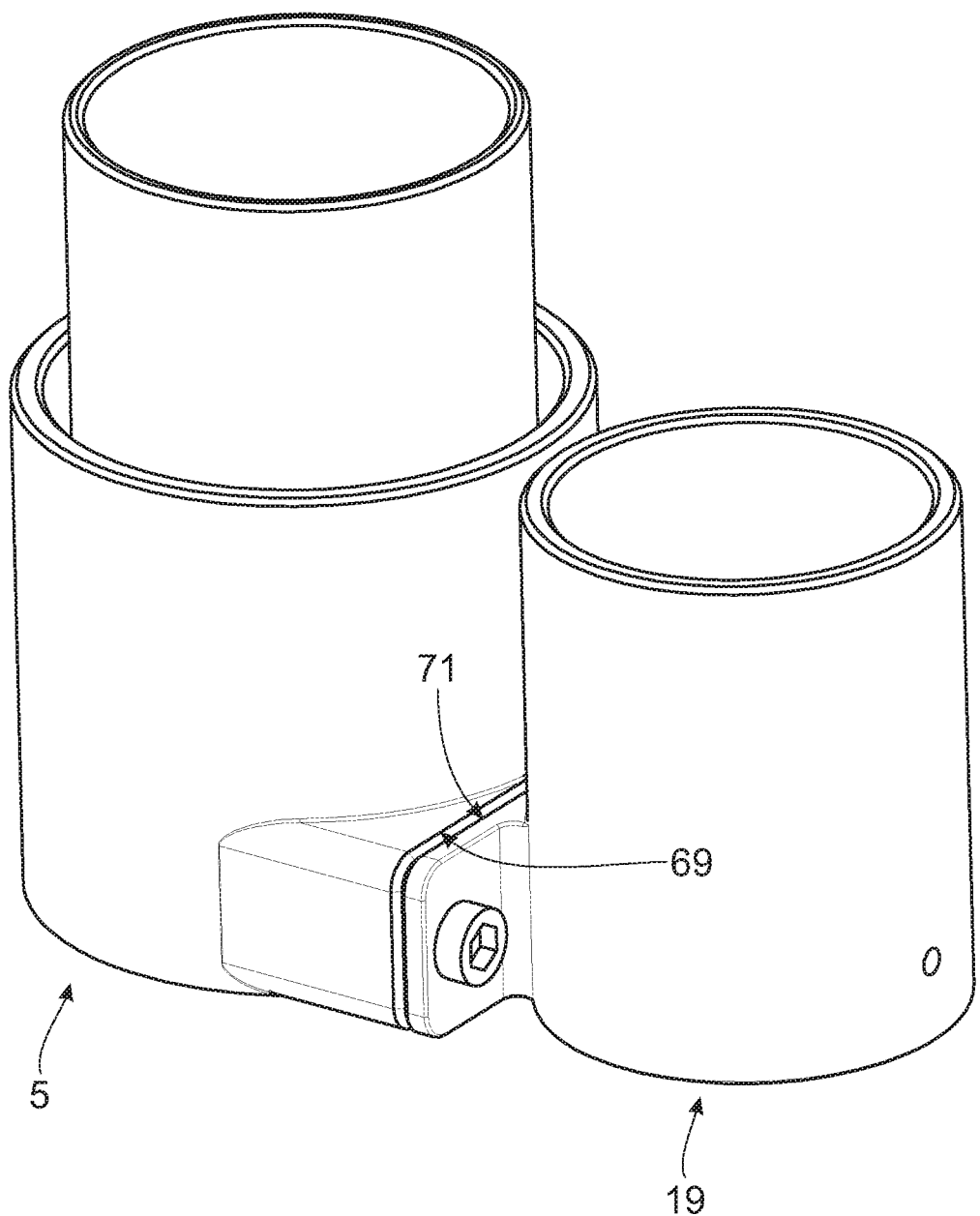
FIGS. 7-9 is aw perspective view of a screwable total housing.
Figure 8:
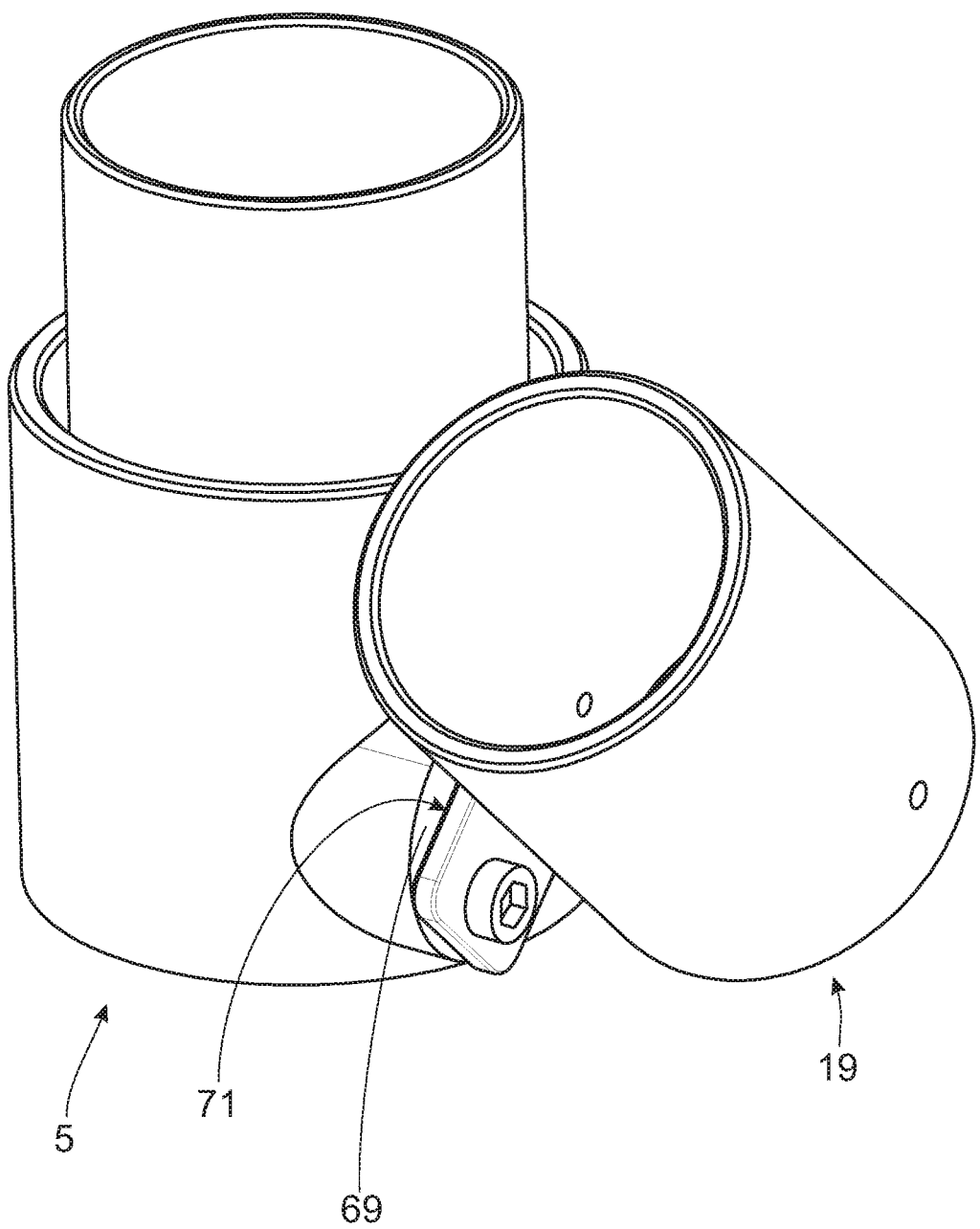
Figure 9:
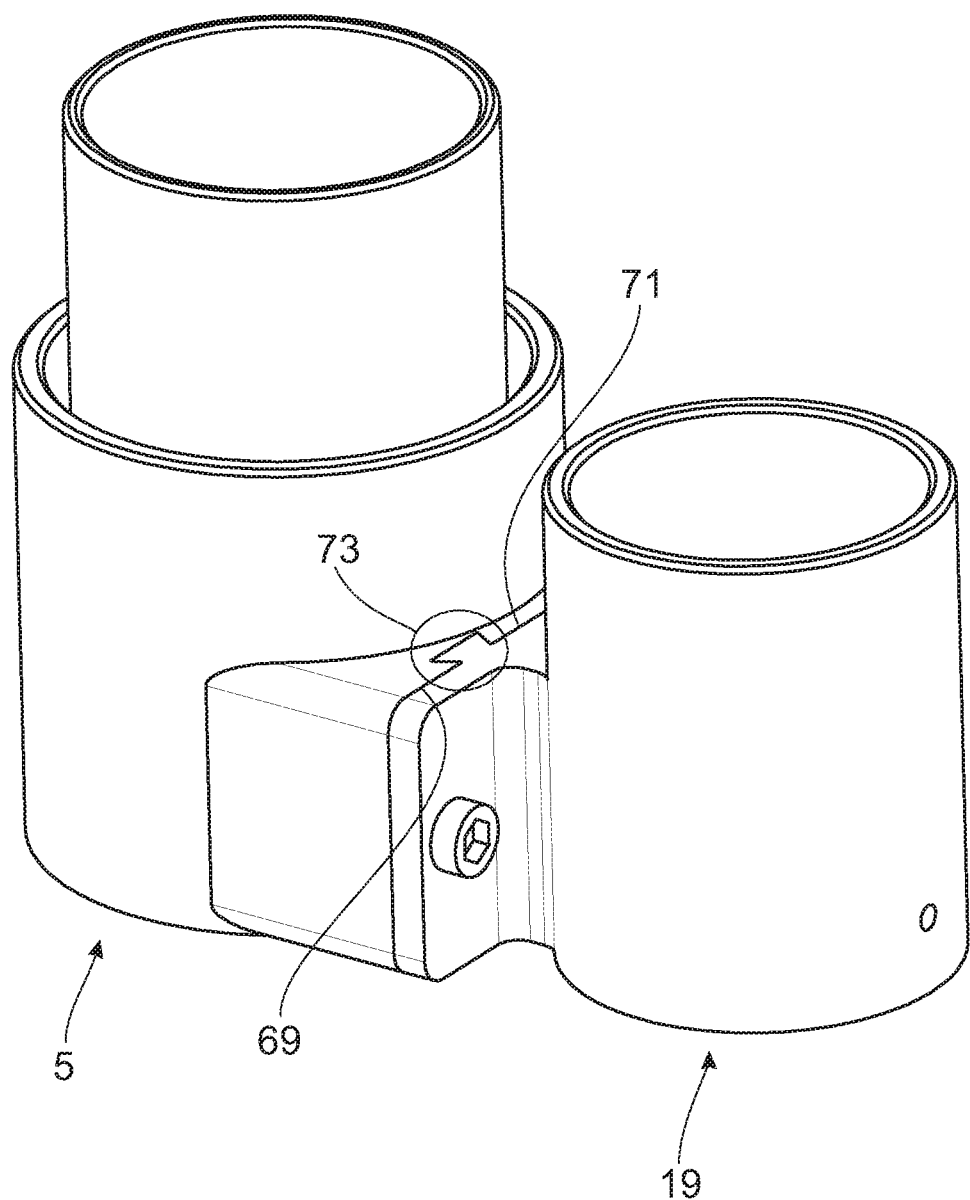

FIGS. 7 to 9 show an embodiment form in which the housing 5 of the actuator and the housing 19 for the pressure medium system 11 are component parts which can be produced separately and which are screwed together to form the total housing. To this end, housing 5 has connection surfaces 69 for fastening surfaces 71 of the housing 19 of pressure medium supply system 11.

FIGS. 7 and 9 show an orientation of housings 5; 19 according to FIGS. 1 to 4. The difference between these two constructions is that a positive-engagement pressure relief joint 73 which is independent from the screw connection is provided in FIG. 9. A dovetail guide is shown by way of example. The two housings 5; 19 can be oriented axially relative to one another via the dovetail guide so that the screw connection can be closed more easily, but radial pull-off forces between the housings 5; 19 are absorbed by the pressure relief joint 73. A compressive load proceeds from the pressure in the pressure medium chamber 31 of the actuator 5.

FIG. 8 is intended to show that the two housings 5; 19 can also be oriented skew to one another. For this purpose, the connection surfaces 69 and the fastening surfaces 71 are correspondingly located at the respective housings 5; 19. As is shown in FIG. 8, a housing 19 according to FIG. 7 can be used and only connection surfaces 69 can be oriented correspondingly at the actuator housing 5.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An adjustable spring support comprising:
a spring plate (9)
an annular actuator (3) having a housing (5), said actuator being constructed for axially adjusting said spring plate (9);
a pressure medium supply system (11) having a housing (19), said pressure medium supply system (11) being constructed for supplying a pressure medium to said actuator (3);
said actuator (3) comprising a pressure medium connection (35) to said pressure medium supply system (11); and said actuator housing (5) being connected directly to said housing (19) of said pressure medium supply system (11); and
additionally comprising at least one pump (13), a pump drive (15) and a supply receptacle (17) carried by said housing (19) of said pressure medium supply system (11).

2. The adjustable spring support according to claim 1, additionally comprising a vibration damper having an outer cylinder (7) and wherein said housing (5) of said actuator (3) is fastened to said outer cylinder (7) of said vibration damper.

3. The adjustable spring support according to claim 2, wherein said outer cylinder (7) of said vibration damper forms an inner wall (33) of a pressure medium chamber (31) of said actuator (5).

4. The adjustable spring support according to claim 2, wherein said outer cylinder (7) of said vibration damper comprises a radial step, and wherein said actuator is supported on said radial step (27).

5. The adjustable spring support according to claim 2, additionally comprising a mechanical stop (45) for limiting a maximum displacement path of said spring plate (9).

6. The adjustable spring support according to claim 5, wherein said outer cylinder (7) of said vibration damper comprises a cap (47) which forms said mechanical stop (45).

7. The adjustable spring support according to claim 1, wherein said housing (19) of said pressure medium supply system (11) is arranged so as to be radially offset with respect to a longitudinal axis (21) of said outer cylinder (7).

8. The adjustable spring support according to claim 1, wherein the supply receptacle (17) is arranged above said pump (13).

9. The adjustable spring support according to claim 1, wherein said annular actuator housing (5) and said housing (19) of said pressure medium supply system (11) are formed integrally.

10. The adjustable spring support according to claim 1, additionally comprising an actuator piston (29) connected to said adjustable spring plate (9) and guided so as to be fixed with respect to relative rotation.

11. The adjustable spring support according to claim 1, wherein said pump drive (15) is a pump motor for driving the pump.

* * * * *